United States Patent [19]

Furrow

[11] Patent Number: 4,812,671
[45] Date of Patent: Mar. 14, 1989

[54] TRANSMISSION BRAKE DISENGAGEMENT CIRCUIT FOR A RACING AUTOMOBILE

[75] Inventor: Robert E. Furrow, Hinton, Okla.

[73] Assignee: B. F. Electronics, Inc., Hinton, Okla.

[21] Appl. No.: 224,542

[22] Filed: Jul. 26, 1988

[51] Int. Cl.$^4$ ............................................. H01H 43/04
[52] U.S. Cl. ..................................... 307/10.1; 307/9.1;
290/37 R; 123/333; 123/335
[58] Field of Search ................ 307/9, 10 R; 290/37 R,
290/38 R, 38 A; 123/333, 334, 335, 349, 350;
180/70.1, 71

[56] References Cited

U.S. PATENT DOCUMENTS

| | | | |
|---|---|---|---|
| Re. 32,474 | 8/1987 | Reid | 123/333 X |
| 4,209,816 | 6/1980 | Hansen | 290/38 R X |
| 4,467,219 | 8/1984 | Reid | 307/10 R |
| 4,490,620 | 12/1984 | Hansen | 290/38 R |
| 4,500,794 | 2/1985 | Hamano et al. | 290/37 R X |
| 4,596,215 | 6/1986 | Palesotti | 123/335 |
| 4,651,018 | 3/1987 | Peterson | 307/9 |

*Primary Examiner*—Bernard Roskoski
*Assistant Examiner*—Paul Ip
*Attorney, Agent, or Firm*—Glen M. Burdick

[57] ABSTRACT

A circuit for disengaging an electrically actuated transmission brake of a racing car has a bank of transistors in series with the brake to hold the brake on at the beginning of a race. The bases of the transistors are connected through normally open contacts of a relay to the emitter of a transistor that can be turned on or off by an optoisolator and the brake is connected through diodes to the relay coil to isolate the transistor bases once the brake has been disengaged. The optoisolator is connected, through diodes, to the zero count terminals of two clocked, programmable counters either of which will turn the optoisolator off at the end of a count. Reset terminals of both counters are connected to the outputs of a flip-flop to disable one counter and toggling of the flip-flop is effected by closing normally open contacts of a second relay to complete a circuit between the flip-flop input and a voltage regulator output through a Schmitt trigger. The second relay contacts are also connected to preset enable terminals of the counters to enter preselected numbers into the counters and prevent counting while the relay is energized. The relay is energized by closure of a starting switch connected between the second relay coil and the car battery so that release of the switch will enable one counter to provide a preselected time delay in the release of the brake.

9 Claims, 2 Drawing Sheets

TRANSMISSION BRAKE DISENGAGEMENT CIRCUIT FOR A RACING AUTOMOBILE

BACKGROUND OF THE INVENTION

1. Field of the Invention

The present invention relates generally to timing circuitry and, more particularly, but not by way of limitation, to circuitry for providing a timed disengagement of an electrically actuated transmission brake of a racing automobile in response to release of a starting switch by the driver of the automobile.

2. Discussion of the Prior Art

The difference between winning and losing a drag race is often measured in thousandth's of a second with the result that getting off to a good start in a race has become a mater of great importance to race car drivers. Because of this, drivers of drag racing cars generally do not wait until they are given a green light on the so-called "Christmas Tree" that controls the starting of a race to take action that will launch their automobiles down the race track. Instead, they utilize other lights that come on before the green light to initiate a chain of events that ends in the disengagement of an electrically actuated transmission brake with which their automobiles are equipped at the moment that or, preferably, slightly before, the green light comes on.

The lights on the "Christmas Tree" are used not only to time the start of a race but also to insure that the racing cars in proper position at the beginning of a race. For the latter purpose, each of two tracks is provided with sensors, light beams and photocells, that define the proper position for the front wheels of participating automobiles at the start of the race. Circuitry connected to these sensors then indicate to the drivers when they are in proper position. Thus, before the race begins, each automobile in the race is inched forward, by momentary disengagements of the transmission brake, until its front wheels cut a first light beam that causes a pre-staging light on the "Christmas Tree" to go on and then again inched forward until a second light beam, causing a staging light to be turned in, is cut. When both the prestaging and staging lights are on for both automobiles in a race, the race is ready to begin.

In addition to the green light, the prestaging light and the staging light, the "Christmas Tree" has a red light that is controlled by the light beam and photocell that actuates the prestaging light and the red light is used to prevent a racer from jumping the gun. If he moves out of position before the green light comes on, so that the prestaging light photocell becomes illuminated, the red light comes on and he loses the race by default. Thus, the ideal start is one in which the transmission brake is disengaged at a time that will cause the racing automobile to be in motion when the green light comes on but in a position in which the automobile will not have moved a distance from the starting position sufficient to result in a red light. Additional lights, often three in number, are provided on the "Christmas Tree" to enable the race car driver to try for this ideal start.

The additional lights are arranged in a vertical row above the green light and come on at half second intervals with the last of them coming on a half second before the green light comes on. Thus, the drivers of drag racing automobiles are in a position to judge the time the green light will come on and react accordingly. This judgement was replaced a few years ago when a timing circuit that eliminated the need to estimate the time the green light will come on was developed. Instead, the circuit was used to disengage the transmission brake and it included a programmable down counter and clock that began a timing sequence when a starting switch was released. Thus, the driver could release the starting switch when the first of the series of lights above the green light came on and the transmission brake would be disengaged when the counter reached a zero count. Since a driver could allow for his reaction time in setting the counter, the introduction of this circuit, which is now in widespread use, theoretically placed him in a position to attain an ideal start.

In practice, the ideal has not been achieved prior to the present invention. It will sometimes occur that the driver of a racing automobile will be distracted by other events when the starting series begins so that he misses the first light in the series. Since the prior art circuit is constructed to disengage the transmission brake at a fixed time following the release of the starting switich, the result is that he gets off to a late start and loses the race. Moreover, the prior art circuit does not permit the driver of a racing automobile to exercise his judgment if he senses that he has mistimed his release of the starting switch. Once the switch is released in the prior art circuit, the chain of events leading to the disengagement of the transmission brake cannot be reversed without starting anew and missing the green light.

Additionally, a danger exists with this circuit that can lead not only to the loss of a race but also to damage to the racing automobile. The circuit is used in an environment characterized by vibration and heat which can give rise to spurious signals that can have the effect of turning on electronic components of the circuit. Thus, it is possible for the circuit to engage the transmission brake during a race and such engagement of the transmission brake can severely damage the transmission of the racing automobile. The transmission brake operates, in effect, by placing the automobile in both forward and reverse gear at the same time so that the transmission becomes locked up in trying to cause mutually exclusive motions of the automobile. So long as the wheels of the automobile are not turning, such locking of the transmission will cause no harm. However, if the automobile is moving when the transmission brake engages, the transmission brake must work against the motion of the wheels, to bring them to a sudden stop, with the result that the transmission is subjected to large reaction forces that are capable of doing severe damage to the transmission.

SUMMARY OF THE INVENTION

In one aspect, the present invention provides the driver of a racing car with the capability of rejecting a timing light as the initiation point for setting his car into motion. Thus, for example, if he misses the first timing light, he may take the next one. Similarly, if he does not like the "feel" of one light, he can start over with the next light. Moreover, he may make the choice by merely reclosing the starting switch and releasing it again when the next light on the "Christmas Tree" comes on. To this end, the circuit of the present invention includes a brake release circuit that provides electrical power to the transmission brake in a deactivated state but is operable to interrupt the flow of current to the transmission brake in response to a countdown signal received by the brake release circuit, a plurality of clocked counters that will each produce such a countdown signal if enabled, a circuit that will transmit the signal from any of these counters to the brake release circuit and a circuit that is operated by the starting switch to enable a selected one of the counters. Thus, once the racing car is staged, momentary releases of the starting switch will enable one counter that has been programmed to disengage the transmission brake at a time appropriate for counting from the first of the timing lights. The next counter, which can be enabled by a subsequent release and reclosure of the starting switch, is programmed to disengage the transmission brake at a time appropriate for counting from the second timing light so that the driver can elect either of these two lights as his go signal or can elect the second light should he miss the first.

In a second aspect of the invention, the brake release circuit is constructed to prevent the transmission brake from becoming engaged by electrical noise, short circuits, or the like, that might occur in the timing circuitry. To this end, supply of electrical power to the transmission brake is controlled by transistors, forming a part of the brake release circuit, that are placed in series with a solenoid of which the transmission brake is comprised. Thus, by placing an appropriate voltage at the bases of these transistors, the transmission brake can be engaged or disengaged. In the present invention, these voltages are provided through normally open contacts of a relay whose coil can be energized along only two conducting paths, one from the starting switch and one from the junction between the transistors and the solenoid of the transmission brake. Thus, when the starting switch is released by the driver of the automobile in response to one of the timing lights, one of the paths to the relay coil is interrupted. The other, from the transistors that energize the transmission brake solenoid, remains intact while the selected counter times out the interval to the disengagement of the brake so that the transmission brake remains engaged during the counting interval. At the end of the interval, the enabled counter provides a countdown signal that is used in the brake release circuit to turn off the transistors connected to the transmission brake solenoid and, in so doing, break the remaining conducting path to the coil of the relay. Thus, at the moment the transmission brake is disengaged, the relay through which a base signal is supplied to the transistors that engage it is deenergized to isolate these transistors and thereby eliminate any possibility that the transmission brake might be engaged while the starting switch remains open. Since the starting switch is left open during a race, no possibility exists that the transmission brake might become engaged during a race.

An object of the present invention is to provide a timing circuit for a drag racer that permits the driver of the racer to select a timing light used to initiate events leading to setting his racer into motion.

Another object of the invention, while achieving the before-stated object, is to provide a racing car driver with the capability of recovering from missing a timing light in starting a race.

Yet another object of the invention, while achieving the before-stated objects, is to provide a racing car driver with a capability of reversing a choice he has made of a timing light to start a race.

Still another object of the invention, while achieving the before-stated objects, is to prevent setting of an electronically controlled transmission brake of a racing car during a race.

Other objects, advantages and features of the present invention will become apparent from the following detailed description when read in conjunction with the drawings and appended claims.

DESCRIPTION OF THE CIRCUIT

Figure 1:
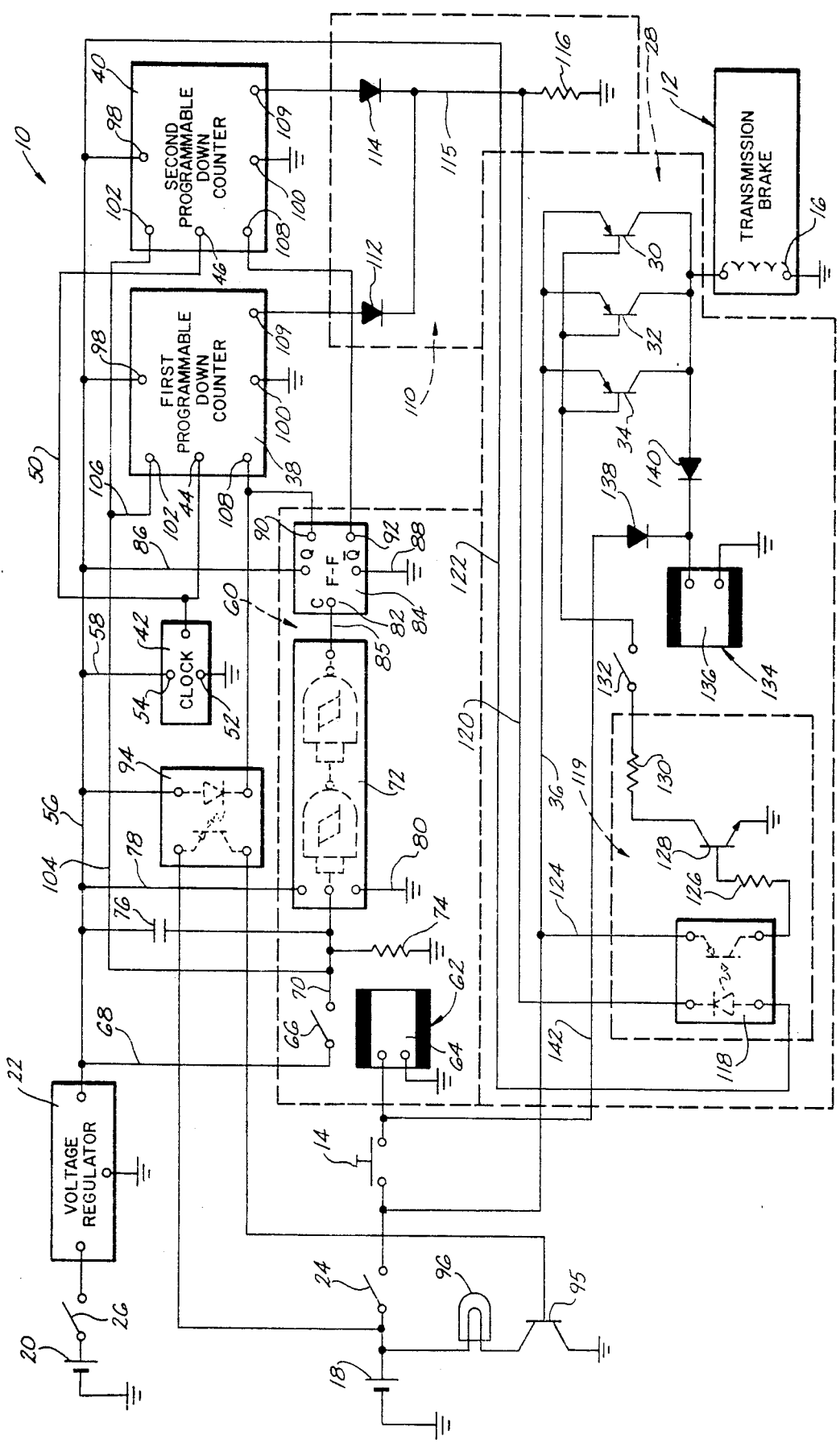
FIG. 1 is a circuit diagram for the transmission brake disengagement circuit of the present invention.

Referring to FIG. 1, shown therein and designated by the general reference numeral 10 is a schematic diagram of a circuit constructed in accordance with the present invention to disengage an electrically actuated transmission brake 12 of a racing automobile a selected one of a plurality of preselected times following the release of a pushbutton starting switch 14 by the driver of the automobile. As is conventional, it is contemplated that the transmission brake 12 be comprised of a solenoid 16, shown in dashed lines in FIG. 1, and that the transmission 12 will be engaged at such times that an electrical current flows through the solenoid 16 and disengaged at such times that no current flows through the solenoid 16. It is further contemplated that, during use of the circuit 10, the circuit 10 will be mounted in any convenient location on the racing automobile with the starting switch 14 mounted on the steering wheel of the automobile to facilitate use of the circuit 10 by the automobile driver. Moreover, it is contemplated that the circuit 10 will be operated by an electrical power source (not numerically designated in the drawings) that is comprised of the vehicle battery 18 that supplies electrical power to portions of the circuit 10 and a nine volt transistor battery 20 that supplies electrical power to a voltage regulator 22 from which other portions of the circuit 10 are operated. The cathodes of the batteries 18 and 20 can be connected to the vehicle chassis to form a circuit ground and suitable power switches 24 and 26 can be provided to turn the circuit 10 off when it is not in use.

In general, the circuit 10 is comprised of a brake release circuit 28 which provides an electrical conducting path between the vehicle battery 18 in a deactuated state of the circuit 28 that occurs in the absence of the transmission of an electrical signal, referred to herein as a countdown signal, to the circuit 28. To this end, the brake release circuit is comprised of a plurality of parallel PNP power transistors having collectors connected to one end of the solenoid 16, the other end of which is grounded, and emitters connected to the anode of the vehicle battery 18 via a conductor 36 and the switch 24. Thus, the transmission 12 can be engaged by grounding the bases of the transistors 30-34 and disengaged by isolating the bases of the transistors 30-34 in a manner to be discussed below. For the moment, it will suffice to note that the circuit 28 is constructed to isolate the bases of the transistors 32-34 in response to a countdown signal and ground the bases of the transistors 30-34 at all other times that the circuit 10 is on.

The countdown signal is provided by either of two programmable down counters, a first counter 38 and a second counter 40, that can be selectively enabled to count down from selected numbers set into the counters 38, 40 in response to clock pulses provided by a clock 42 that is connected to clock input terminals 44 and 46 of the counters 38 and 40, respectively, via conductors 48 and 50, respectively. A suitable clock for the circuit 10 can be constructed using a type 4060 ripple counter and a 6.5536 megahertz crystal connected in the crystal oscillator circuit shown at page 5-70 of Logic Databook, Volume I, National Semiconductor Corporation, 1984. Such a clock will produce electrical pulses at a rate of one kilohertz so that the counters, when enabled, will count down to zero in a numer of milliseconds equal to the number set therein. Electrical power for the clock 42 can be provided by grounding the source terminal of the 4060 ripple counter and connecting the drain terminal 54 to a power line 56 from the voltage regulator 22 via a conductor 58. The counters 38 and 40 will be discussed more fully below.

Enablement of a selected counter, 38 and 40, is effected by a counter enabling circuit 60 that is connected between the counters 38, 40 and the starting switch 14 so that the starting switch 14 can be utilized both to enable one of the counters 38, 40, and thereby select the time required for a countdown signal to appear at the brake release circuit 28, and to initiate counting as will be discussed below.

With this general description of the circuit 10, it will be useful to begin the detailed description of the circuit 10 with the counter enabling circuit 60. As shown in FIG. 1, the counter enabling circuit 60 is comprised of a relay 62 having a coil 64 connected at one end thereof to the starting switch 24 and grounded at the other end thereof so that closure of the starting switch 24 will energize the relay 62 to close a normally open contact assembly 66 of the relay 62. One end of the assembly 66 is connected to the power line 56, via conductor 68, and the other end of the assembly 66 is connected, via conductor 70, to the input of a Schmitt trigger 72 that is used to eliminate transients arising from contact bounce when the contact assembly 66 closes. (A suitable Schmitt trigger is half a type 4093 Quad 2-Input NAND gate with two of the gates thereof connected serially with both inputs of each connected together as indicated in dashed lines in FIG. 1). The Schmitt trigger input is additionally connected through a resistor 74 to the system ground and through a capacitor 76 to the power line 56, and the drain and source thereof are conventionally connected between the power line 56 and system ground via conductors 78 and 80, so that the Schmitt trigger 60 will provide an output voltage rise to substantially the voltage regulator output voltage when the starting switch 14 is closed to energize the relay 64 and an output voltage drop to substantially ground when the switch 14 is released to deenergize the relay 64. These voltage changes are transmitted to the toggle input terminal 82 of a type D flip-flop 84 via conductor 85 and the drain and source terminals of the flip-flop 84 are connected to the power line 56 and ground via conductors 86 and 88, respectively, so that each time the switch 14 is opened and then closed the flip-flop 84 is toggled to reverse the voltage states of the set and reset output terminals 90 and 92, respectively, thereof. (A suitable flip-flop for the circuit 10 is half a type 4013 Dual D flip-flop with the reset output terminal thereof connected to the data terminal thereof so that the clock terminal will serve as a toggle input terminal and toggling occurs on the upgoing edge of a pulse). It will thus be seen that closure of the switch 14 will energize the relay 64 to provide an upgoing voltage to the flip-flop 84 which is toggled thereby. With subsequent release and closure of the switch 14, the flip-flop is again toggled so that the output of the flip-flop 84 that is positive can be selected, when the switch 14 is closed, by merely momentarily releasing and the closing of the switch 14. As will be discussed below, the state of the flip-flop 84 is used to suppress counting by one of the counters 38, 40 so that the driver of the racing automobile may select the time period between the release of the starting switch 14 and disengagement of the transmission brake 12. The circuit 10 is futher provided with an indicator of the counter that has not been suppressed, such indicator comprising a type H11A1 optoisolator 94 in which the diode thereof is connected between the output 90 of the flip-flop 84 and the power line 56 for emission of light when the output 90 is at a low voltage level, an NPN transistor 95 having a grounded emitter and a base connected through the phototransistor of the optoisolator 94 to the anode of battery 18, and a lamp 96 connected between the collector of transistor 95 and the anode of battery 18. As will be clear to those skilled in the art, the use of an optoisolator permits the lamp to be controlled by a small current drawn from the battery 20 while the lamp current is drawn from the vehicle battery 18 so that the lamp will not place an excessive power demand on the battery 20 and voltage regulator 22.

Referring now to the counters 38 and 40, it has been found that suitable operating characteristics for the circuit 10 can be achieved by connecting four type 4522 Programmable Divide-by-N 4-bit BCD counters into a conventional cascade circuit in the manner that has been disclosed for a 2-stage Programmable Down Counter illustrated at page 5-272 of Logic Databook, Volume I, National Semiconductor Corporation, 1984. While the counters are thus constructed of conventional integrated circuits interconnected in a conventional manner, so that the counters 38 and 40 need not be described in detail for purposes of disclosing the construction of the circuit 10, it will nevertheless be useful to briefly describe the characteristics of the type 4522 counter and the cascade circuit disclosed in the reference in order to provide a better understanding of the construction and operation of the circuit 10 of the invention.

Initially, each type 4522 counter of each of the counters 38, 40 has drain and source terminals which can be connected between a positive voltage and a corresponding ground to provide power for operating the type 4522 counter. In the counters 38, 40, the drain and source terminals of each counter in the cascade are connected together to form power and ground terminals, 90 and 100, in each of the counters 38, 40 shown in FIG. 1, and these terminals can be connected to the power line 56 and to ground, respectively, to provide power for all type 4522 counters in each of the counters 38, 40.

Further, each type 4522 counter in the cascade is provided with a 4-bit thumbwheel switch unit and a resistor bank, as shown in the referenced publication, so that any digit from 0 to 9 can be entered into any one of the type 4522 counters by positioning a thumbwheel on which the digit is indicated, thereby closing a pattern of switches in the thumbwheel switch unit that follows the binary expression of that digit, and subsequently providing a positive voltage, with respect to the counter ground, to a preset enable terminal of each of the type 4522 counters. In the counters 38, 40, the preset enable terminals of the four type 4522 counters of which the counters 38 or 40 is comprised are connected together to form counters 38, 40 preset enable terminals 102 that receive a positive voltage to enter four digit numbers into the counters 38, 40. It will be noted that the use of four type 4522 counters in each of the counters 38, 40, and clocking the cascade with a one kilohertz clock enables the counters 38, 40 to provide timing intervals measureable in one millisecond intervals up to a maximum interval of 9.999 seconds.

A characteristic of the type 4522 counter that is utilized in the invention is that a positive voltage at the preset enable terminal 102 not only enters a count set into the thumbwheels into the counter, 38 or 40, but also suppresses counting thereby. For counting to occur, the preset enable terminals 102 of the counters 38, 40 must be grounded. The loading of the counters 38, 40 and subsequent initiation of counting by one of them, with closure and subsequent release of the starting switch 14, is effected by connecting the preset enable terminals 102 of counters to the output side of the contact assembly 66 of relay 64 via conductors 104, 106. Thus, when the switch 14 is closed before a race begins to close the contact assembly, the present enable terminals are connected to the power line 56 for loading numbers into one counter 38, 40 and, when the switch 14 is opened, such counter begins a countdown to zero that ends with the end of the time interval set into the counter.

Only one counter 38, 40 is so enabled to count because of the connection of the flip-flop 84 to the counters 38, 40. Each of the type 4522 counters in the counters 38, 40 has a reset terminal and these are connected together to form reset terminals 108 for the counters 38, 40 that are connected to the output terminals 90, for the counter 38, and 92, for the counter 40, of the flip-flop 84. The type 4522 counters are constructed to be reset so long as they receive a positive voltage on their reset terminals so that the flip-flop suppresses counting by the counter connected to the flipflop terminal that is at a high logic state. Since the flip-flop is toggled by actuation of the switch 14, the driver of the automobile can select the counter that is enabled upon release of the switch 14 by momentary closures of the switch 14 before the start of a race including the period in which the timing lights preceding the green light are coming on in sequence. The connection of the diode of the optoisolator 94 that has been noted above will cause the indicator lamp 96 to come on when the terminal 90 of the flip-flop is low so that the illumination of the lamp 96 indicates that that counter 38 will count when the switch 14 is released.

Each of the type 4522 counters in each of the counters 38, 40 is also provided with a "0" terminal that becomes positive whenever the number in the type 4522 counter reaches zero in the absence of a positive voltage at a cascade forward terminal of the counter. In the cascade, the "0" terminals of the type 4522 counters that contain all but the least significant digit set into the cascade are connected to the cascade feedback terminal of the counter containing the next least significant digit to coordinate the operation of the counters making up the cascade so that the cascade will continue counting until all of the type 4522 counters have reached a zero count. The "0" terminal of the type 4522 counter containing the least significant digit is used as a zero count terminal 109 for each of the counters 38, 40 as has been indicated in FIG. 1. A characteristic of the type 4522 counter that is exploited in the circuit 10 is that the "0" terminal is held to substantially ground voltage at such times that the counter is reset.

Finally, the clock terminals 44 and 46 of the counters 38 and 40 are clock terminals of the type 4522 counter that contains the least significant digit of the time interval to be counted out by a counter 38, 40. Each of the remaining type 4522 counters in each cascade receive clock signals from the 4522 counter containing the next lower significant digit so that one of the type 4522 counters in each of the counters 38, 40 counts milliseconds, the next counts hundredths of a second, the next counts tenths of a second and the last counts seconds.

The operation of the counters 38, 40 can now be seen from the above description of their construction. Whenever the switch 14 is closed to close contact assembly 66 of relay 64, the flip-flop 84 is toggled to reset one of the counters 38, 40, and thereby suppress counting thereby, while loading a preselected number into the other counters 38, 40. Counting by such other counter 38, 40 is also suppresed by the voltage transmitted to the preset enable terminal 102 thereof from the contact assembly 66 while the switch 14 remains closed. Moreover, the driver knows which counter is being suppressed only by the signal to the preset enable terminal by the state of the lamp 6. When the switch 14 is released, to ground the preset enable terminals 102 of both counters 38, 40 via resistor 74, the counter 38, 40 that is not being suppressed by the flip-flop 84 will count down from the number set thereinto in response to pulses from the clock 42. When the count reaches zero, at the end of a time interval that has been selected for the counter, 38 or 40, that is counting, the zero count terminal becomes positive and remains so until the counter is either reset or again loaded. (The maintenance of a zero count in one of the counters 38, 40 is achieved by connecting the "0" terminal of the type 4522 counter in each cascade that contains the least significant digit to an inhibit terminal of such type 4522 counter). In the circuit 10, the rise in voltage of the zero count terminal of either counter 38 or 40 provides a countdown signal that is transmitted to the brake release circuit to cause the transistors 30-32 to become non-conducting and release the transmission brake 12.

The countdown signal that is thus provided by one of the counters 38, 40 at the end of a timed interval following the release of the switch 14 is transmitted to the brake release circuit 28 by a countdown signal transmission circuit 110 that is comprised of diodes 112, 114 having anodes connected to the zero count terminals 108 of the counters 38, 40, respectively, and cathodes connected, via conductor 115, to one end of a resistor 116, the other end of which is grounded. The voltage at the ungrounded side of the resistor 116 is then transmitted to the cathode of the diode of a type H11A1 optoisolator 118, forming a portion of a transistor switching circuit 119, itself a portion of the brake release circuit 28, on conductor 120. (The diode and phototransistor of the optoisolator 118 have been shown in dashed line in FIG. 1). The anode of the diode of the optoisolator 118 is connected, via conductor 122 to the power line 56 so that the effect of a countdown signal by either counter 38, 40 will be to turn off the diode of the optoisolator 118 and make the phototransistor thereof non-conducting. The transistor switching circuit 119 is further comprised of an NPN transistor 128 and the collector of the phototransistor of the optoisolator 118 is connected to the base of the transistor 128 via a resistor 126. The emitter of the phototransistor of the optoisolator 118 is connected to the anode of the vehicle battery 18 via a conductor 124, the conductor 36 and the power switch 24 and the emitter of the transistor 128 is grounded so that the transistor 128 similarly turns off when a countdown signal is received by the brake release circuit 28 at the optoisolator 118. The output of the transistor switching circuit is formed by a resistor 130 connected between the collector of the transistor 128 and the bases of the transistors 30–34 that control the operation of the transmission brake. The latter connection is via a normally open contact assembly 132 of a relay 134 which, as will be discussed below, is energized during the time interval during which one of the counters 38, 40 is counting. Thus, during counting and while the transistor 128 is turned on, the bases of the transistors 30–34 will be grounded through the transistor 128 to transmit a current from the vehicle battery 18 to the solenoid 16 of the transmission brake 12 and prevent movement of the racing automobile. At the end of the timing period counted by the enabled counter, the countdown signal generated thereby turns off the diode of the optoisolator 118, the phototransistor of the optoisolator, and the transistor 128 in sequence to turn off the transistors 30–34 and disengage the transmission brake.

The relay 134 provides an important safety factor in the use of an electronic circuit, rather than a manually actuated switch, to control an electrically actuated transmission brake. In the environment in which such a circuit is used, the circuit will be subjected to heat and vibration that can give rise to spurious signals that could turn the circuit on and engage the transmission brake during a race. Not only would such engagement cost a racer the race but, as has been noted above, could severely damage the transmission of his automobile. In part, such result is avoided by using three power transistors, the transistors 30–34, to control the current through the solenoid 16. The transistors 30–34 are selected so that the trio used has a much larger current handling capacity than is needed to control the transmission brake 12. Thus, heating of the transistors 30–34 by the currents passing therethrough is minimized to prevent the possibility of a temperature rise of one of the transistors 30–34 causing a transition to a conducting state that would engage the transmission brake 12 at an inopportune time.

The relay 134 provides a second part of this safety factor. As shown in FIG. 1, one side of the coil 136 of the relay 134 is grounded and the other side is connected to the juncture of the cathodes of diodes 138 and 140. The anode of diode 138 is connected to the output end of the switch 14 by a conductor 142 so that the switch 14, when closed, will form one conducting path from the anode of the vehicle battery 18 to the coil 136 and hold the contact assembly 132 closed. As will become clear below, the switch 14 is released during a race so that this conducting path to the coil of the relay 134 is open during a race. The anode of the diode 140 is connected to the high voltage side of the transmission brake 12 to provide a second conducting path to the coil 136 of the relay 134, via the transistors 30–34, while these transistors are conducting during the timing interval in which one of the counters is counting down. When the countdown is complete and the transistors 30–34 become non-conducting, as described above, to launch a race, this second path is interupted so that, during the race, the coil 136 of the relay is electrically isolated to open the contact assembly 132 and, consequently, isolate the bases of the transistors 30–34.

OPERATION OF THE CIRCUIT

Figure 2:
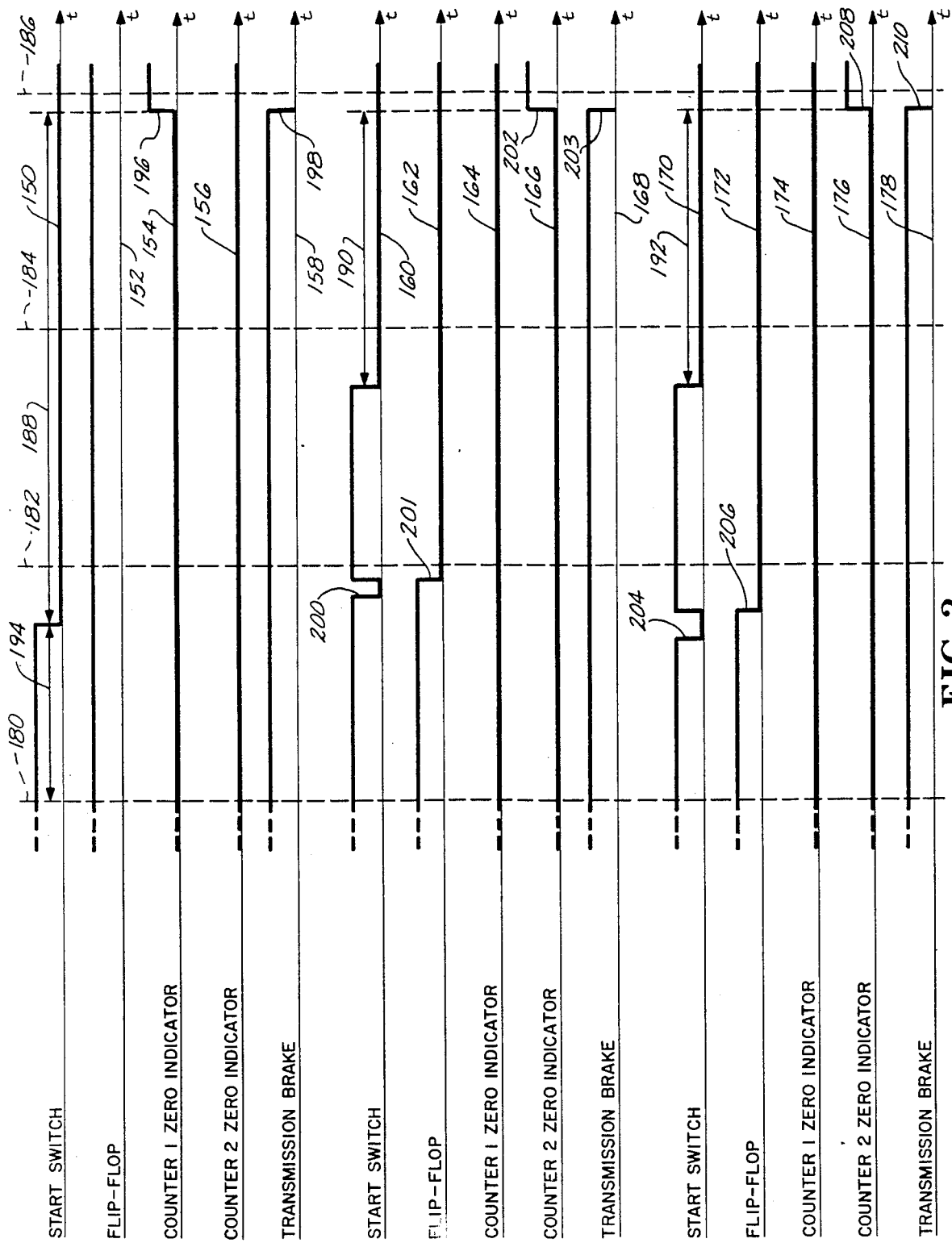
FIG. 2 is a timing diagram illustrating three modes of operation of the circuit of FIG. 1.

FIG. 2 illustrates three timing diagrams corresponding to three ways in which the circuit 10 can be used to approach an ideal start for a racing automobile in a drag race. To this end, the fifteen graphs shown therein each have time plotted on the abscissa and are arranged in three groups of five graphs each corresponding to a "Normal" start (time axes 150–158), a "Delayed" start (time axes 160–168), and a "Rejected" start (time axes 170–172). For concreteness of description, such figure has been drawn for the case in which the "Christmas Tree" used to start a race includes three timing lights that are turned on sequentially prior to the green light that signals the start of a race and it is assumed that these four lights come on at half second intervals indicated by the four dashed, vertical lines 180–186 in the drawing.

The uppermost of each group of five graphs in FIG. 2 indicates the state of the starting switch 14 (time axes 150, 160, 170) with times that the switch 14 is closed being indicated by an upward displacement of a graph from the time axis. The second member of each group of graphs (time axes 152, 162, and 172) indicates the state of the flip-flop 84 with an upward displacement of the graph from the axis indicating a high voltage state at the output terminal 92 to suppress counting by the second counter 40 while counting by the first counter 38 is suppressed only at such times that the switch 14 is closed to transmit a signal to the preset enable terminal 102 of counter 38 and following a countdown of counter 38. The third and fourth members of each group (time axes 154, 164, 174 and 156, 166, 176, respectively) indicate the voltage state at the zero indicator terminals 109 of counters 38 and 40, respectively, with the voltage at such terminal being plotted on the ordinate. The last member of each group (time axes 158, 168, 178) illustrate the state of transmission brake 12 with current through the solenoid 16 being plotted on the ordinate.

Prior to his entry in a race, the driver of the racing automobile will program the counters 38 and 40 by entering four digit numbers, corresponding to times ranging from 0 to 9.999 seconds, into the thumbwheel switches with which the type 4522 counters of the counters 38 and 40 are used. These numbers will be selected to adjust for his reaction time in the release of the switch 14 in response to a selected timing light on the "Christmas Tree" , with typical times being 1.070 seconds for the counter 38 and 0.570 seconds for the counter 40, and the corresponding times have been represented in FIG. 2 by arrows 188, 190, and 192 above the time axes 150, 160 and 170, respectively. Prior to the beginning of a race in which he is entered, he will stage his automobile by a series of actuations of the switch 14 in which the switch 14 remains open for a series of time periods which are each of sufficient duration to momentarily disengage the transmission brake and, by this means, will inch his automobile to the starting position. Once in position, he will maintain pressure on the switch 14 until the first timing light comes on if the indicator lamp 90 is on; that is, if the first counter 38 is not being suppressed by the flip-flop 84. If the indicator lamp 90 is off, he will momentarily release the starting switch 14 to momentarily deenergize the relay 62 and momentarily open the contact assembly 66 thereof. As the contact assembly 66 re-closes, an upgoing voltage will be transmitted via the Schmitt trigger 72 to the flip-flop toggle input 82 to toggle the flip-flop and cause suppression of counting by the flip-flop to be transferred from the first counter 38 to the second counter 40 as indicated to the driver by the indicator lamp 90. In either event, the switch 14 will be closed when the first of the timing lights comes on, as indicated by all of the "Start Switch" graphs and the vertical line 180 for each of the three starting scenarios illustrated in FIG. 2, and the flip-flop 84 will be suppressing counting by the second counter 40 as indicated by all fo the "Flip-Flop" graphs in FIG. 2.

Thus, at the time that the first timing light comes on, the state of the circuit will be as follows. Initially, the coil of relay 134 will be energized via the conducting path provided by the conductor 142 and the diode 138. Thus, contact assembly 132 will be closed. Further, with the final closure of the switch 14 before the start of the race, and consequent closure of the contact assembly 66 of the relay 62, a positive voltage will be transmitted to the preset enable terminal 102 of the counter 38 so that the countdown time that has been selected for the counter 38 will be entered therein but counting by such counter will be suppressed by the voltage at the preset enable terminal 102 thereof. Since the number held in the counter 38 is thus non-zero, the zero count terminal 109 of counter 38 will be at ground potential and, moreover, the zero counter terminal of the counter 40 will similarly be at ground potential because of the transmittal of a positive voltage to the reset terminal 108 thereof from the output terminal 92 of the flip-flop 84. Accordingly, the cathode of the diode of the optoisolator 118 will be grounded through conductor 120 and resistor 116 while the anode of such diode will be at a positive voltage because of the connection of such anode to the power line 56 via conductor 122. Thus, the diode of the optoisolator 118 will conduct to emit light and turn the transistor of the optoisolator 118 on. The transistor of the optoisolator will provide a conducting path from the anode of the automobile battery 18 to the base of transistor 128 to ground the bases of transistors 30-34 through the contact assembly 132 of relay 134 and turn on the transistors 30-34 to transmit a current from the anode of the automobile battery 18, via conductor 36, to the solenoid 16 of the transmission brake 12. Thus, the transmission brake 12 will be engaged at the time that the first timing light comes on and a second cnducting path to the coil 136 of relay 134 will be provided by the transistors 30-34 and the diode 140.

In a "Normal" start, the driver of the racing automobile will release the starting switch in response to the first of the timing lights so that the starting switch 14 will open at a time that is delayed with respect to the first timing light by the reaction time of the driver as indicated by the arrow 194 on the time axis 150. With the opening of the starting switch 14, the conducting path from the battery 18 to the coil of relay 134 formed by the switch 14, conductor 142 and diode 138 will open so that energization of the relay 134 will be effected solely by the conducting path to the coil 136 thereof formed by the transistors 30-34. Further, the relay 62 will become deenergized so that the contacts 66 thereof will open allowing the voltage on preset terminal 102 of counter 38 to drop to ground via the connection therebetween formed by the conductors 104, 106 and the resistor 74 to enable the counter 38 to begin a countdown in response to pulses received from the clock 42. During this counting period, the zero count terminals of both counters 38, 40 will remain at substantially ground potential, because of a non-zero count in the first counter 38 and because of suppression of the second counter 40, so that the state of the brake release circuit 28 will not be immediately affected by release of the starting switch 14. Thus, the transmission brake 12 remains engaged and the relay 134 remains energized by a current provided by the transistors 30-34.

At the end of the time period 188 programmed into the first counter 38, the count in such counter will become zero so that the zero count terminal 109 of counter 38 will become positive, as indicated at 196 on the third time axis in the uppermost group in FIG. 2, to transmit a countdown signal to the cathode of the diode of the optoisolator 118 via the diode 112 and conductors 115 and 120. Thus, the potential at the cathode of the diode of the optoisolator 118 will rise to the potential at the anode of such diode to terminate emission of light thereby and turn off the transistor of the optoisolator 118. Accordingly, the transistor 128 becomes non-conducting to eliminate grounding of the bases of transistors 30-34 so that the transistors become non-conducting to release the transmission brake 12 just before the green light comes on as indicated at 199 on the last time axis of the first group of graphs in FIG. 2. Simultaneously with the release of the transmission brake 12, the remaining conducting path to the coil of relay 134, via the transistors 30-34 and diode 140, is interrupted to open cantact assembly 132 and eliminate any possibility that the transistors 30-34 might again become conducting, prior to a subsequent closure of the starting switch 14, to engage the transmission brake during the race.

In the "Delayed" start, the actions taken by the driver of the racing automobile before the first timing light comes on are identical to the actions taken in the "Normal" start so that, when this light comes on, the driver will be holding the starting switch 14 closed and the state of the circuit 10 will be the same as in the case of the "Normal" start. However, the "Delayed" start contemplates that the driver will, for some reason, fail to respond to the first timing light; for example, he might be momentarily distracted by some happening on the track. Accordingly, should he attempt a "Normal" start, the transmission brake 12 of his automobile will disengage slightly late with the result that he will make a bad start that can cost him the race. In this case, he momentarily releases and recloses the starting switch 14 as indicated at 200 on the uppermost of the second group of graphs in FIG. 2 and waits for the second of the timing lights. When the switch 14 is opened, the coil 64 of relay 62 deenergizes to open contact assembly 66 and begin counting by the counter 38 as in the "Normal" start so that the zero count terminal 108 of both counters 38, 40 remain at ground potential as before. Further, the toggle input terminal 82 of the flip-flop 84 becomes grounded by the Schmitt trigger 72, in response to grounding of the input to the Schmitt trigger 72 through the resistor 74, so that the flip-flop 84 can be toggled by an upgoing voltage. Thus, when the starting switch is reclosed, to close contact assembly 66 of relay 62, the Schmitt trigger is again activated to provide an upgoing signal to the input terminal 82 of the flip-flop 84 to toggle the flip-flop 84 as indicated at 201 in FIG. 2. Thus, the voltage at the output terminal 90 of flip-flop 84 will rise to reset counter 38 while the voltage at the output terminal 92 will drop to enable counting by the counter 40. Simultaneously, closure of the contact assembly 66 will provide a positive voltage to the preset enable terminal 102 of the counter 40, on conductor 104, to enter the countdown time selected for the second counter 40 thereinto. Thus, following the momentary release of the switch 14, the circuit 10 will be in a state that differs from the state thereof when the first timing light comes on only in that counting by the first counter 38 is now suppressed by the flip-flop 84 while counting by the second counter 40 is suppressed by the voltage transmitted to the preset enable terminal 102 thereof on conductor 104. Accordingly, the second counter 40 will respond to clock pulses from the clock 42 when the switch 14 is subsequently released when the second timing light comes on. As noted above, the second counter 40 is programmed with a time that, when combined with the driver's reaction time, will result in termination of counting thereby slightly before the green light comes on. Thus, the driver can again release the starting switch 14 when the second light comes on to obtain a countdown signal as indicated at 202 in FIG. 2, on the counter 40 zero count terminal 109 just before the green light comes on. This countdown signal is transmitted to the brake release circuit 28 via diode 114 to cause release of the transmission brake 12, as indicated at 203 in FIG. 2, and isolation of the bases of transistors 30–34 just before the green light comes on in the same manner that has been described above for the "Normal" start.

The "Rejected" start occurs when the driver releases the starting switch in response to the first timing light so that the starting switch 14 will open as indicated at 204 in FIG. 2 and again initiate the "Normal" start chain of events. Should the driver sense that his release of the starting switch 14 has not occurred at an appropriate moment for disengagement of the transmission brake 12 just before the green light comes on, the circuit 10 enables him to reject the start he has made by merely reclosing the starting switch 14 and waiting for the second timing light. When he recloses the starting switch 14, the flip-flop 84 will toggle, as indicated at 206 in FIG. 2, to initiate the same set of events that occur with the reclosure of the starting switch 14 in the "Delayed" start. Thus, release of the starting switch 14 in response to the second timing light will give rise to the production of a countdown signal, as indicated at 208 in FIG. 2, by the second counter 40 to disengage the transmission brake 12, as indicated at 210 in FIG. 2, just before the green light comes on.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A circuit mountable on a racing automobile and operable by an electric power source for interposing a selected one of a plurality of preselected time delays between the opening of a manually actuable starting switch and the disengagement of an electrically actuated transmission brake of the racing automobile, comprising:

brake release means, electrically connecting the transmission brake to the power source, for providing electrical power to the transmission brake in a deactuated state of the brake release means and for interrupting the transmission of electrical power to the transmission brake in response to a countdown signal supplied to the brake release means;

a clock for providing a series of electrical clock pulses at a preselected rate;

a plurality of counters each connected to the clock to receive said clock pulses, wherein each counter is characterized as being of the type that will produce a countdown signal in response to the reception thereby of a preselected number of clock pulses in an enabled state of the counter;

countdown signal transmission means for transmitting the countdown signal produced by any counter to the brake release means; and counter enabling means electrically connected between the starting switch and the counters for selecting a counter to be enabled upon closure of the starting switch and enabling such counter upon release of the starting switch.

2. The circuit of claim 1 wherein the brake release means comprises:

at least one switching transistor serially connected between the transmission brake and the racing automobile battery via the emitter and collector of the transistor; a relay;

transistor switching means connected to the base of the transistor through a normally open contact assembly of the relay for switching the transistor into a non-conducting state in response to a countdown signal received by the brake release means at such times that the relay is energized to close said contact assembly; and means for providing a unidirectional conducting path between the transmission brake and the coil of the relay so as to hold the relay in an energized state at such times that the transmission brake is electrically actuated.

3. The circuit of claim 2 wherein the brake release means is comprised of a plurality of transistors serially connected between the transmission brake and the racing automobile battery via the emitter and collector of the transistors; and wherein the base of each transistor is connected to the transistor switching means through said normally open contacts of the relay.

4. The circuit of claim 2 further comprising means for indicating the counter that has been selected for enablement.

5. The circuit of claim 1 further comprising means for indicating the counter that has been selected for enablement.

6. The circuit of claim 1 wherein each counter is of the type wherein counting thereby in response to clock pulses is suppressed by an electrical signal at either one of a reset terminal or a preset enable terminal thereof; and wherein the counter enabling means comprises:

a flip-flop having one output terminal connected to the reset terminal of one counter, a second output terminal connected to the reset terminal of the other counter, and a toggle input terminal receptive to an electrical signal for toggling the flip-flop; and means for providing an electrical connection between the power source and the preset enable terminals of both counters and between the power source and the toggle input terminal of the flip-flop at such times that the starting switch is closed.

7. The circuit of claim 6 wherein the brake release means comprises:

at least one switching transistor serially connected between the transmission brake and the racing automobile battery via the emitter and collector of the transistor; a relay;

transistor switching means connected to the base of the transistor through a normally open contact assembly of the relay for switching the transistor into a non-conducting state in response to a countdown signal received by the switching circuit at such times that the relay is energized to close said contact assembly; and means for providing a unidirectional conducting path between the transmission brake and the coil of the relay so as to hold the relay in an energized state at such times that the transmission brake is electrically actuated.

8. The circuit of claim 7 wherein the brake release means is comprised of a plurality of transistors serially connected between the transmission brake and the racing automobile battery via the emitter and collector of the transistors; and wherein the base of each transistor is connected to the transistor switching means through said normally open contacts of the relay.

9. A circuit mountable on a racing automobile and operable by an electric power source for interposing a preselected time delay between the opening of a manually actuable starting switch and disengagement of an electrically actuated transmission brake of the racing automobile, comprising:

brake release means, electrically connecting the transmission brake to the power source, for providing electrical power to the transmission brake in a deactuated state of the brake release means and for interrupting the transmission of electrical power to the transmission brake in response to a countdown signal supplied to the brake release means, wherein the brake release means comprises:

at least one switching transistor serially connected between the transmission brake and the racing automobile battery via the emitter and collector of the transistor;

a relay; transistor switching means connected to the base of the transistor through a normally open contact assembly of the relay for switching the transistor into a non-conducting state in response to a countdown signal received by the switching circuit at such times that the relay is energized to close said contact assembly; and means for providing a unidirectional conducting path between the transmission brake and the coil of the relay so as to hold the relay in an energized state at such times that the transmission brake is electrically actuated;

a clock for providing a series of electrical clock pulses at a preselected rate;

at least one counter connected to the clock to receive said clock pulses, wherein the counter is characterized as being of the type that will produce a countdown signal in response to the reception thereby of a preselected number of clock pulses in an enabled state of the counter;

countdown signal transmission means for transmitting the countdown signal produced by any counter to the brake release means; and means for enabling the counter in response to opening of the the starting switch.

* * * * *